(12) United States Patent
Maloney (10) Patent No.: US 8,948,374 B2
(45) Date of Patent: Feb. 3, 2015

(54) METHOD AND SYSTEM FOR A WIRELESS EAR BUD

(75) Inventor: Mark J. Maloney, Glen Allen, VA (US)

(73) Assignee: Verizon Virginia LLC, Ashburn, VA (US)

( * ) Notice: Subject to any disclaimer, the term of this patent is extended or adjusted under 35 U.S.C. 154(b) by 1448 days.

(21) Appl. No.: 11/691,924

(22) Filed: Mar. 27, 2007

(65) Prior Publication Data

US 2008/0240417 A1 Oct. 2, 2008

(51) Int. Cl.
*H04M 1/00* (2006.01)
*H04M 19/04* (2006.01)
*H04M 1/725* (2006.01)

(52) U.S. Cl.
CPC ............ *H04M 19/04* (2013.01); *H04M 1/7253* (2013.01)
USPC ...................................... 379/376.02; 455/567

(58) Field of Classification Search
USPC ................................ 379/372, 373.05, 376.02, 379/211.01–214.01, 455, 418
See application file for complete search history.

(56) References Cited

U.S. PATENT DOCUMENTS

| | | | | |
|---|---|---|---|---|
| 3,736,379 A * | 5/1973 | Kagan | .......................... | 379/93.05 |
| 3,876,837 A * | 4/1975 | Gormley et al. | ......... | 379/100.01 |
| 3,922,508 A * | 11/1975 | Brady | ............................ | 714/716 |
| 4,053,717 A * | 10/1977 | Snider | ............................ | 455/462 |
| 4,620,063 A * | 10/1986 | Todd | ............................. | 379/382 |
| 4,993,060 A * | 2/1991 | Kelly | ............................ | 379/55.1 |
| 5,142,564 A * | 8/1992 | Chu | ............................. | 379/88.11 |
| 5,239,580 A * | 8/1993 | Bruno et al. | ................. | 379/443 |
| 5,490,205 A * | 2/1996 | Kondo et al. | ................. | 379/67.1 |
| 5,890,069 A * | 3/1999 | Evans et al. | .................. | 455/462 |
| 5,892,817 A * | 4/1999 | Will | ........................ | 379/102.02 |
| 5,940,775 A * | 8/1999 | Kim | ............................. | 455/567 |
| 6,233,330 B1 * | 5/2001 | McClure et al. | ......... | 379/212.01 |
| 6,266,020 B1 * | 7/2001 | Chang | ........................... | 343/702 |
| 6,826,174 B1 * | 11/2004 | Erekson et al. | ............... | 370/352 |
| 6,845,242 B1 * | 1/2005 | Carley | .......................... | 455/462 |
| 7,266,187 B2 * | 9/2007 | Horne | ...................... | 379/142.06 |
| 7,978,844 B1 * | 7/2011 | Tannenbaum | ........... | 379/376.02 |
| 2004/0038673 A1 * | 2/2004 | Dunn et al. | .................... | 455/417 |
| 2004/0116108 A1 * | 6/2004 | Ra | ................................. | 455/418 |
| 2004/0131174 A1 * | 7/2004 | Lucey et al. | ............. | 379/373.01 |
| 2004/0160947 A1 * | 8/2004 | Hardy et al. | .................. | 370/352 |
| 2004/0264681 A1 * | 12/2004 | Silver | ........................ | 379/373.01 |
| 2005/0049004 A1 * | 3/2005 | Bultman | ........................ | 455/557 |
| 2005/0239469 A1 * | 10/2005 | Vallstrom et al. | .............. | 455/445 |
| 2006/0034266 A1 * | 2/2006 | Harris et al. | ................... | 370/356 |
| 2006/0039577 A1 * | 2/2006 | Sanguino et al. | ............. | 381/315 |
| 2007/0203979 A1 * | 8/2007 | Walker et al. | .................. | 709/204 |

* cited by examiner

*Primary Examiner* — Fan Tsang
*Assistant Examiner* — Jeffrey Lytle (57) ABSTRACT

Exemplary embodiments include methods and systems for detecting an incoming telephone signal, processing the incoming telephone signal, transmitting the processed signal to a remote receiver and alerting a remote user of the incoming signal.

16 Claims, 7 Drawing Sheets

METHOD AND SYSTEM FOR A WIRELESS EAR BUD

BACKGROUND INFORMATION

Generally telephones operate through transmission of an electric signal over a telephone network which enables a telephone user to communicate with another telephone user. However, a telephone may alert a user of an incoming call by a loud ring tone which may be disruptive and non-discrete. A user may adjust the volume of a ring tone on a telephone, however, the ring tone may be adjusted to a low volume which may cause a user to miss an important telephone call. Also, the ring tone may be adjusted to a high volume which may disturb or interrupt a user or anyone near the user. The loud ring tone is a particular problem if a user wants to be alerted of a call without disturbing others, e.g., a sleeping baby.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

An exemplary embodiment provides a system and process for discretely alerting a user of an incoming telephone call by blocking a ring tone of a telephone. For example, a detection system may be connected to, integrated or otherwise associated with a telephone system, e.g., a telephone. The detection system may communicate with a remote system through a network, such as a wireless network. The remote system may be proximal to a remote user so that the remote user may be discretely notified of an incoming call without disturbing others nearby. Advantageously, the detection system may alert users of an incoming telephone call while allowing users to roam freely within a transmission coverage area of the wireless detection system. Additionally, the wireless detection system may enable a user to answer a telephone call while away from a telephone.

An exemplary wireless detection system may notify users of an incoming telephone call without disturbing others within a range of a telephone ring. For example, the wireless detection system may include an ear piece or other device that may alert or notify the user of an incoming call without alerting or disturbing others. For example, parents may not want a telephone call to wake a sleeping child. The wireless detection system enables the parents to be alerted to the telephone call without disturbing the child. Also, as the wireless detector system may alert a user of a telephone call discretely, the user may go to a secured and/or encrypted landline to conduct a private conversation. Further, a wireless detection system may extend telephone access to a remote location without the limitation of a telephone line. In addition, the wireless detection system may facilitate communication in a temporarily available location, such as a meeting room or the like.

Figure 1:
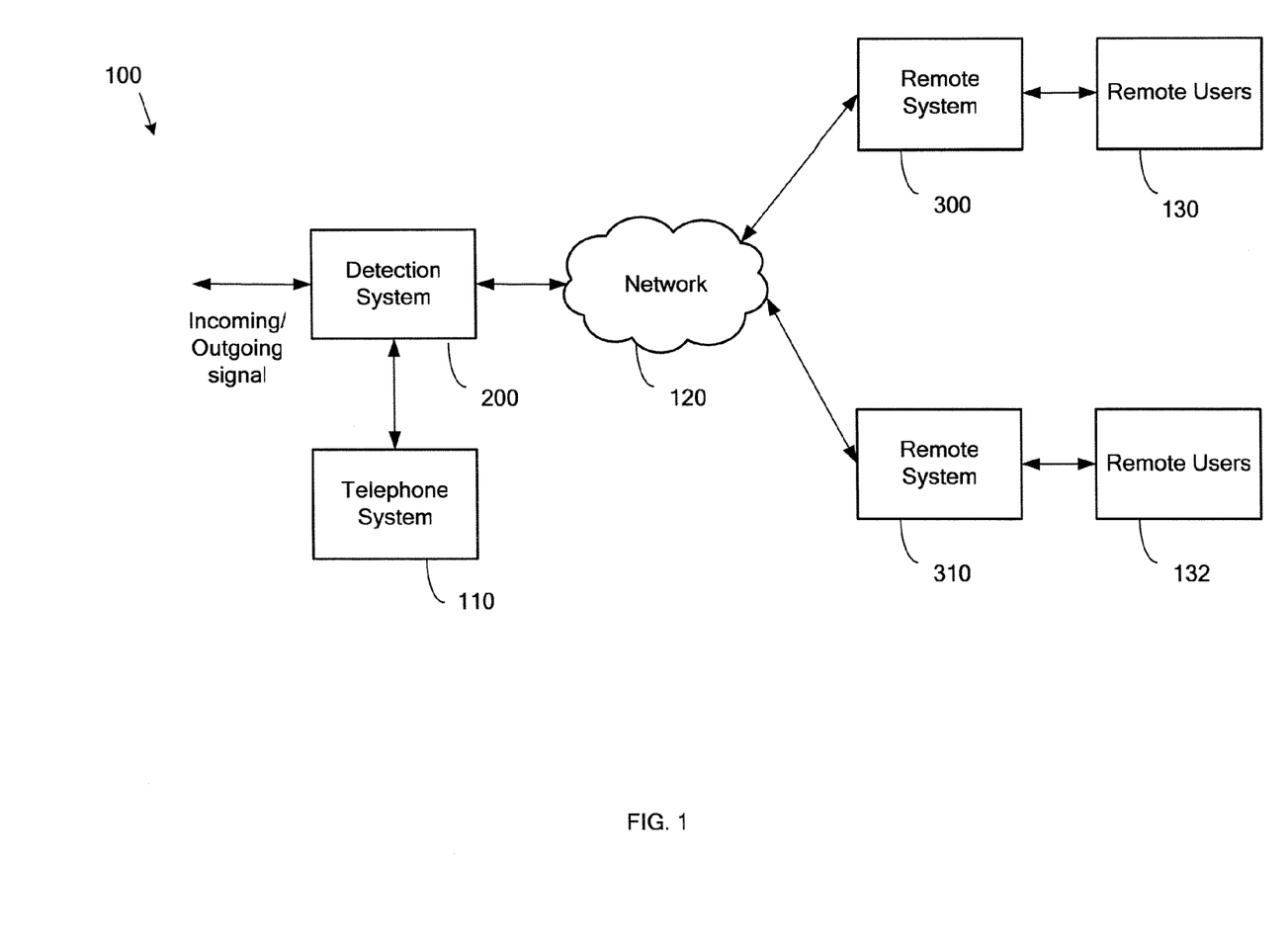
FIG. 1 depicts an exemplary system for alerting a remote user of an incoming telephone call, according to an exemplary embodiment.

FIG. 1 is an exemplary system for alerting a remote user of an incoming telephone call, according to an embodiment of the present invention. System 100 illustrates an exemplary system for alerting a remote user of an incoming telephone call. As illustrated, a detection system 200 may be coupled to a telephone system 110. An incoming signal may by detected by detection system 200 and transmitted to a remote system 300 via a network 120 while suppressing the incoming signal at telephone system 110. Remote system 300 may receive the incoming signal and alert a remote user 130, without altering others in proximity of the telephone system 110.

Telephone system 110 may be a digital telephone system, wireless phone system, cordless telephone system, mobile phone system, satellite phone system, semi-cordless phone system, IP telephone system and/or any other known telephone systems. According to an exemplary embodiment, telephone system 110 may be an IP telephone system which may include any computer device, or communications device including, for example, a personal computer (PC), a workstation, a mobile device, a handheld PC, a personal digital assistant (PDA), an alert device, a receiver, and other similar devices.

Detection system 200 may be connected to or associated with telephone system 110. For example, detection system 200 may be an external device that connects to and/or communicates with telephone system 110. Detection system 200 may be an external device connected to telephone system 110 via an interface port which may include, without limitation, USB port, system bus port, or Firewire port and other similar interface ports. According to another example, detection system 200 may be integrated with telephone system 110. Further, computer code may be installed on an IP telephone system to control and/or operate a function of detection system 200. Detection system 200 may communicate with one or more remote systems 300, 310. Remote systems 300, 310 may include an ear piece or other receiving device that may transmit a tone or otherwise alert remote users 130, 132 of an incoming signal. Detection system 200 may communicate with remote systems 300, 310 through a network 120. Network 120 may be a wireless network, a wired network or any combination of wireless, wired and/or other network. For example, network 120 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or any other similar wireless network. In addition, network 120 may include, without limitation, telephone line, fiber optics, IEEE Ethernet 802.3, wide area network (WAN), local area network (LAN), global network such as the Internet. Also, network 120 may enable, a wireless communication network, a cellular network, an Intranet, or the like, or any combination thereof. Network 120 may further include one, or any number of the exemplary types of networks mentioned above operating as a stand-alone network or in cooperation with each other.

According to an exemplary embodiment, network 120 may be a wireless network that enables a half-duplex communication system, a full-duplex communication system, an echo cancellation system and/or any similar duplex communication system. For example, network 120 may enable a full-duplex communication system which may include a time-division duplex system or a frequency-division duplex system and/or any other similar full duplex system. A time-division duplex system may be enabled by network 120 may include, without limitation, W-CDMA time-division system, UMTS time-division system, TD-SCDMA time-division system, DECT time-division system, IEEE 802.16 WiMax time-division system, half-duplex packet mode networks based on carrier sense multiple access system, wireless local area networks, Bluetooth and/or any other similar time-division duplex systems. A frequency-division duplex system may be enabled by network 120 may include, without limitation, ADSL frequency-division system, VDSL frequency-division system, UMTS frequency-division system, WCDMA frequency-division system, IEEE 802.16 WiMax frequency-division system and/or any other similar frequency-division duplex systems.

Figure 2:
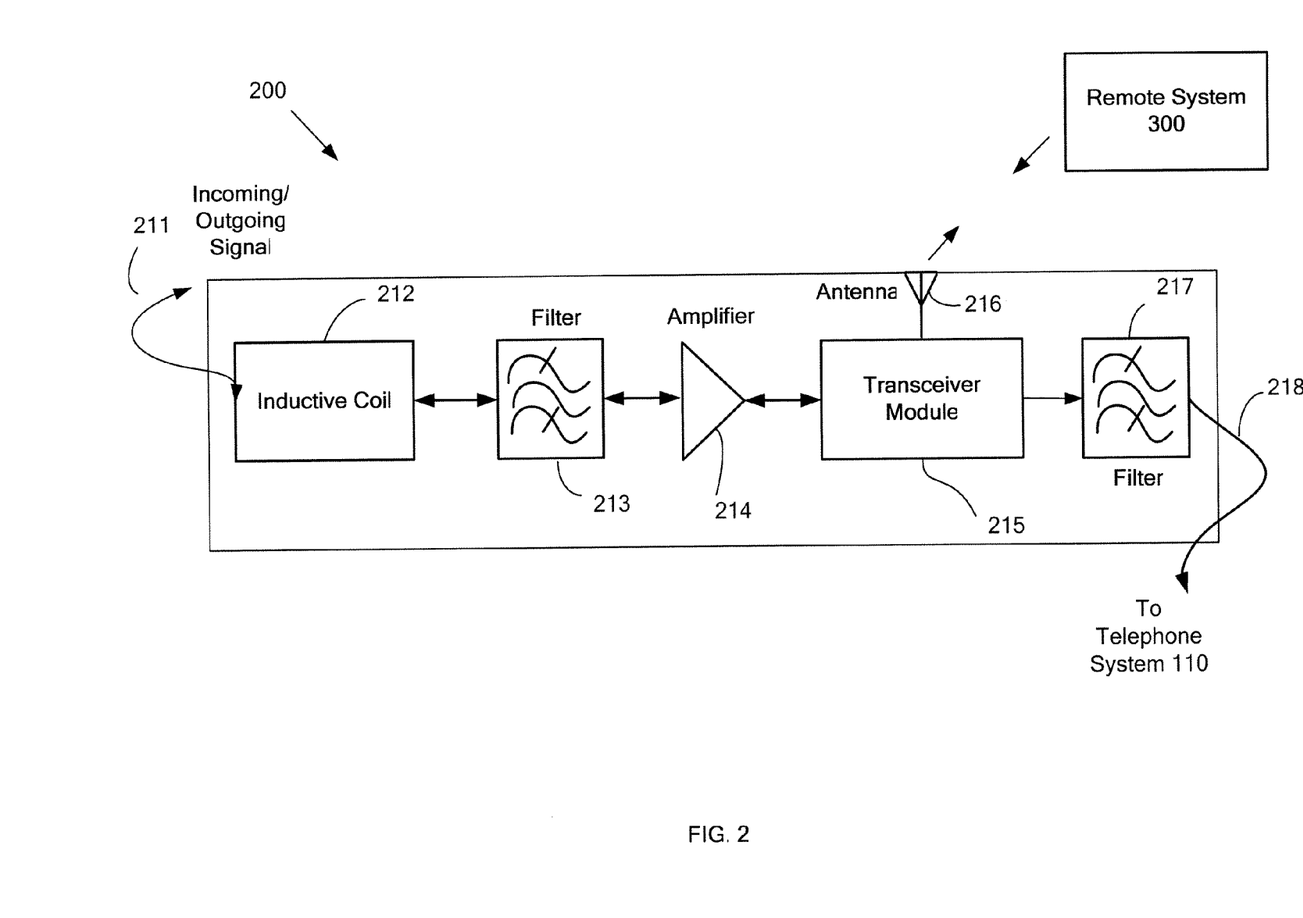
FIG. 2 depicts an exemplary detection system for a system of alerting a remote user of an incoming telephone call, according to an exemplary embodiment.

FIG. 2 depicts an exemplary detection system 200, according to an exemplary embodiment. As discussed above, detection system 200 may be coupled to telephone system 110 as an external device. Also, detection system 200 may be incorporated within telephone system 110 as an integrated device. For example, detection system 200 may be clipped on an incoming phone line. Further, detection system 200 may be an external device coupled to telephone system 110 and/or an external device which may be coupled between telephone system 110 and a telephone plug. Also, detection system 200 may be an integrated device which may be incorporated into telephone system 110 and may be activated via a keypad and/or a keyboard associated with telephone system 110. Other variations may be implemented.

Phone line 211 may transmit an incoming signal in the form of an electrical signal to telephone system 110 to alert remote user 130 of an incoming telephone call. Phone line 211 may be wired. In addition, phone line 211 may represent a wireless connection. An inductive coil 212 may detect the incoming signal transmitted by phone line 211 during a receiving process. Also, inductive coil 212 may induct a signal associated with remote user 130 onto phone line 211 during a transmission process to enable communication between telephone users. Inductive coil 212 may transmit the detected incoming signal to a filter 213. Filter 213 may pass the incoming signal while attenuating any noise associated with the incoming signal. Filter 213 may transmit the filtered incoming signal to an amplifier 214. Amplifier 214 may amplify the filtered incoming signal to a predetermined strength and transmit the amplified signal to a transceiver module 215. Transceiver module 215 may include a transmitter, a receiver or a combination of transmitter and receiver and an antenna 216. Transceiver module 215 may process the amplified signal and transmit the amplified signal to remote system 300. Also, transceiver module 215 may receive a signal associated and with remote user 130 and process the received signal. Further, transceiver module 215 may transmit the incoming signal to a filter 217. Filter 217 may attenuate the incoming signal thereby suppressing the ring tone at telephone system 110. Filter 217 may be coupled to the telephone system 110 via a communication link 218. FIG. 2 illustrates an exemplary embodiment of detection system 200. Other variations may be implemented. While the components of detection system 200 are shown as a single component. The components may be further duplicated, combined, separated and/or otherwise modified based on the desired applications and/or implementations.

Inductive coil 212 may include a single stage of inductive coil to detect an incoming signal transmitted by phone line 211 and induct a signal associated with remote user 130 onto phone line 211. Also, inductive coil 212 may include multiple stages of inductive coil where one or more stages of inductive coil may detect an incoming signal transmitted by phone line 211 and additional one or more stages of inductive coil may induct a signal associated with remote user 130 onto phone line 211. Inductive coil 212 may be a transformer or other electrical devices which may transfer energy from one circuit to another by magnetic and/or electromagnetic coupling.

Filter 213 may include a band-pass filter and/or one or more various types of filter. Filter 213 may be selected in accordance to a signal to be processed. For example, an incoming signal transmitted by inductive coil 212, a signal associated with remote user 130 and/or other signals which may be processed. Filter 213 may include a single stage of filter or multiple stages of filters. Each stage of filter 213 may pass a band of frequency which may be centered in accordance to a signal to be transmitted while reject frequencies outside the band of frequency.

Amplifier 214 may include an operation amplifier and/or one or more various types of amplifiers. Also, amplifier 214 may include a single stage amplifier or multiple stages of amplifier wherein each stage of amplifier may include a one or more various types of amplifiers to achieve a predetermined strength for a signal.

Transceiver module 215 may include a transmitter, a receiver or a combination of transmitter and receiver. In an exemplary embodiment, a Bluetooth transceiver may be implemented. Also, a superheterodyne transceiver/remote system may be implemented, as described in detail below in FIG. 3. Further, transceiver module 215 may include various types of transceiver which may receive a signal, process the signal and/or transmit the signal. Transceiver module 215 may perform various processing functions such as, amplifying, filtering, modulating/demodulating, mixing, tuning, and other functions may be needed to obtain a predetermined signal.

Transceiver module 215 may transmit the processed signal via a wired or wireless network or the combination thereof to remote system 300. For example, transceiver module 215 may transmit the processed signal via a wireless network which may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.11g, 802.11n and 802.15.1 or other wireless network known in the art. A wired network may be used for transmission by transceiver module 215 may include, without limitation, telephone line, fiber optics, an IEEE Ethernet 802.3 or other wired network known in the art.

Filter 217 may be a band-stop filter and/or other various types of filter which may reject a band of frequency. Filter 217 may select the reject band of frequency in accordance to the processed signal and may pass frequency outside of the band of frequency. For example, filter 217 may be a single stage band-stop filter or multiple stages of filter. Also, one or more stages of filter 217 may include a single type of filter or a combination of various types of filters.

Figure 3:
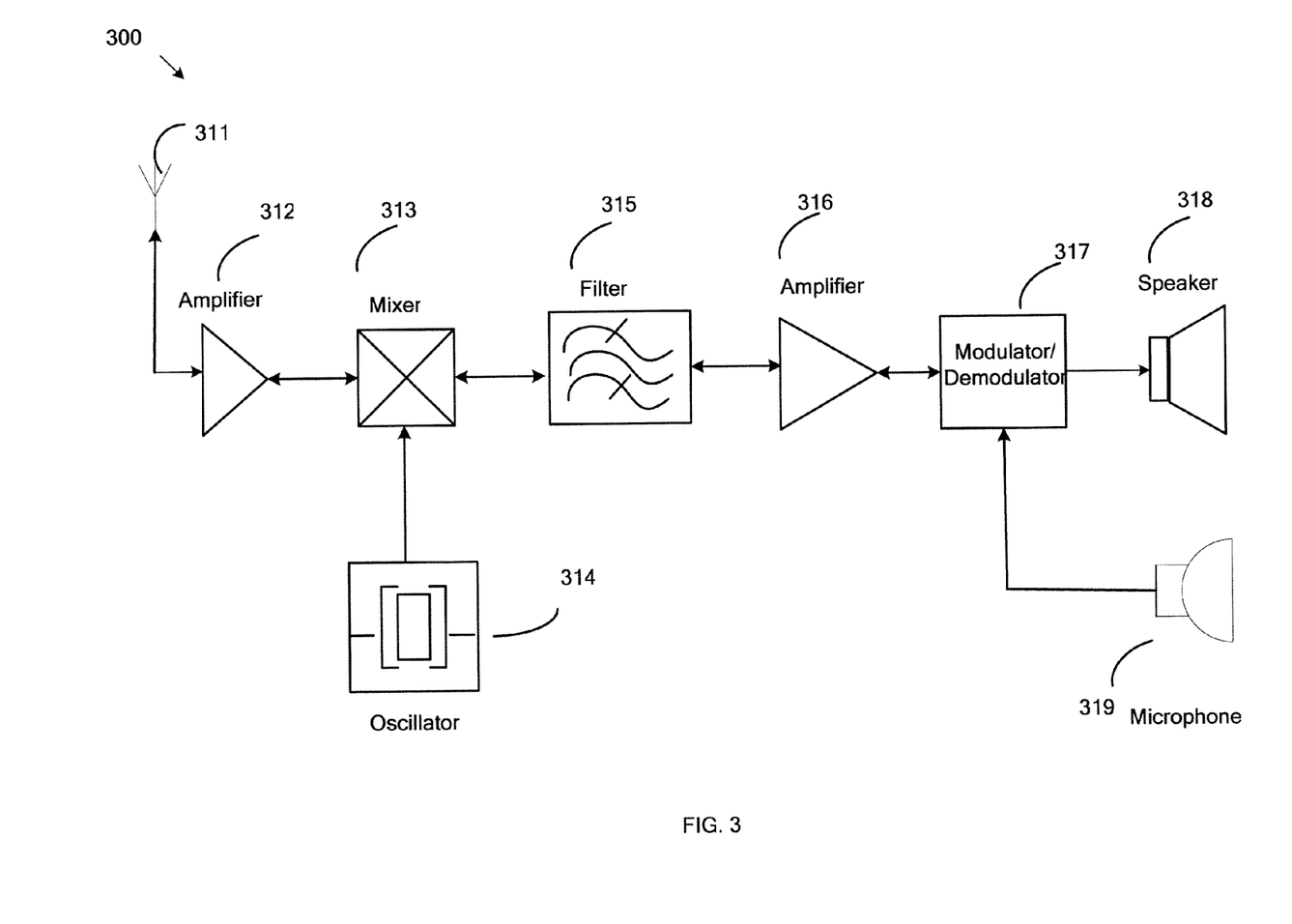
FIG. 3 depicts an exemplary transceiver device for a system of alerting a remote user of a coming telephone call, according to an exemplary embodiment.

FIG. 3 depicts remote system 300, according to an exemplary embodiment. FIG. 3 illustrates Remote system 300 which may include a transceiver such as a superheterodyne transceiver. Remote system 300 which may include a transceiver for enabling communication with detection system 200. For example, remote system 300 may include a remote ear piece, head set and/or other similar device for discretely alerting a remote user. Remote system 300 may include a Superheterodyne Transceiver, a Bluetooth transceiver or other types of transceivers. Other types of transceivers may be implemented.

Remote system 300 may include various devices for alerting a remote user. For example, remote system 300 may include different types of headphones, ear pieces and/or other types of devices. For example, the device may include, without limitation, circumaural, supra-aural, earbuds/earphones, canalphones or other various types of headphones. Also, remote system 300 may be attached to different areas of remote user 130. For example, remote system 300 may attach to various areas including, over the head, behind the head, clip-on any body portion of the remote user, around the ear, under the chin, around the neck and any other body portion of a remote user which may support remote system 300. In addition, remote system 300 may include various types of alerting devices. For example, a remote user may prefer to be alerted by an acoustic, a tone, music, sound, voice and vibration. Other types of notification systems may include a visual notification system, e.g., lights, etc. Remote system 300 may be attached to the remote user via a headphone, ear piece, clip, etc. Also, remote system 300 may be a desktop device that may vibrate or light up or otherwise discretely alert the remote user.

In an exemplary embodiment, transceiver 300 may be enabled by detection system 200 and/or remote system 300. A frequency of transmission by transceiver 300 may be determined according to a range and/or any obstructions which may limit the range of transmission of signal between detection system 200 and remote system 300. For example, standards of transmission between detection system 200 and remote system 300 may include any standards of transmission mentioned above for network 120.

As illustrated in FIG. 3, transceiver 300 may include an antenna 311 which may receive a signal from detection system 200. Antenna 311 may transmit the received signal to an amplifier 312. Amplifier 312 may amplify the received signal to a predetermined strength. Also, amplifier 312 may transmit the amplified signal to a mixer 313. An oscillator 314 may generate a signal associated with the received signal. The signal associated with the received signal generated by oscillator 314 may also be transmitted to mixer 313. Mixer 313 may output an intermediate signal having a frequency distinct from the received signal and/or the signal generated by oscillator 314. The intermediate signal outputted by mixer 313 may have a frequency of the sum of the frequency of the two input signals to mixer 313 and/or the difference of the frequency of the two input signals to mixer 313. The intermediate signal may be filtered and/or amplified by a filter 315 and/or amplifier 316 respectively. A modulator/demodulator 317 may demodulate the filtered and/or amplified intermediate signal to recover information which may be conveyed by the intermediate signal. Modulator/demodulator 317 may transmit the recovered information to a speaker 318 to alert remote user 130. Remote user 130 may send information by a microphone 319 to detection system 200. Microphone 319 may generate a signal associated with remote user 130 and remote system 300 may send remote user 130 information to detection system 200.

Antenna 311 may be an internal antenna, an external antenna and/or various types of antennas. The length and/or the type of antennas for antenna 311 may be implemented in accordance to the frequency of signals transmitted and/or received. Amplifier 312 may be a single stage amplifier or multi-stage amplifier to achieve the predetermined strength for transmitted and/or received modulated signal. Each stage of amplifier 312 may include a single type amplifier and/or a combination of various types of amplifiers.

Oscillator 313 may include one or more oscillators. For example, oscillator 313 may be a single oscillator where the single oscillator may generate a first signal associated with transmission of a signal associated with remote user 130 and/or generate a second signal associated with a signal sent by detection system 200. Also, oscillator 313 may be implement plurality of oscillators wherein one or more of the plurality of oscillators may generate a first signal associated with transmission of a signal associated with remote user 130. Additional, one or more of the plurality of oscillators may generate a second signal associated with a signal sent by detection system 200. Mixer 314 may be a frequency mixer and other various types of mixers which may include multiple inputs and a single output. For example, mixer 314 may include a nonlinear circuit or other various types of circuits which may perform a sum and/or a difference function to output an intermediate signal.

Filter 315 may include a band-pass filter and/or one or more various types of filter. Filter 315 may be selected in accordance to a signal to be processed. For example, a signal sent by detection system 200, a signal associated with remote user 130 and/or other signals which may be processed. Filter 315 may include a single stage of filter or multiple stages of filters. Each stage of filter 315 may pass a band of frequency which may be centered in accordance to a signal to be transmitted and/or received while reject frequencies outside the band of frequency. Amplifier 316 may include an operation amplifier and/or one or more various types of amplifiers. Also, amplifier 316 may include a single stage amplifier or multiple stages of amplifier wherein each stage of amplifier may include a one or more various types of amplifiers to achieve a predetermined strength for a signal.

Modulator/demodulator 317 may modulate an input signal. Modulator/demodulator 317 may enable various types of modulation processes such as, an analog modulation method, a digital modulation method or a combination analog and digital modulation method. Also, modulator/demodulator 317 may demodulate an input signal to recover information associated with the input signal. Speaker 318 may be a passive speaker or an active speaker or any various types of electromechanical transducer which may convert an electrical signal into sound to alert remote user 130. Microphone 319 may be various types of electric transducers which may convert sound associated with remote user 130 into an electrical signal.

Figure 4:
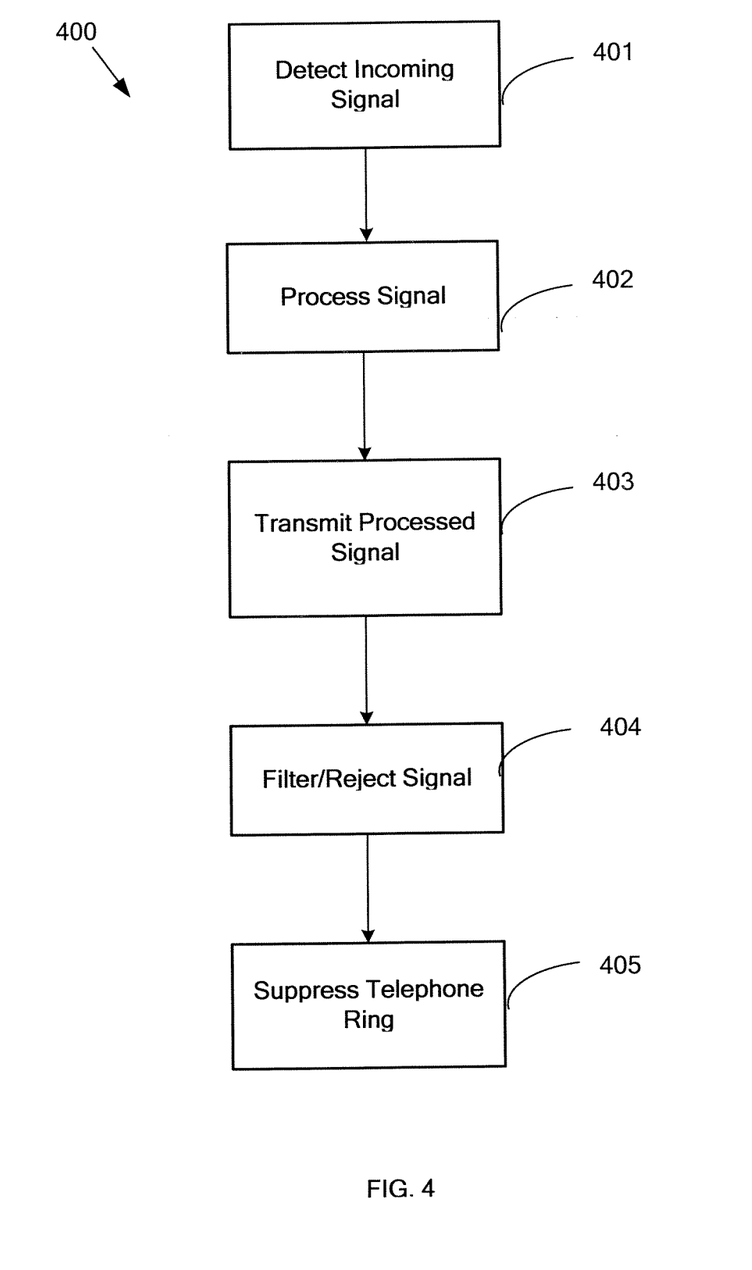
FIG. 4 is an exemplary flowchart illustrating a process of detecting an incoming telephone call, according to an exemplary embodiment.

FIG. 4 depicts a flow chart 400 which illustrates an exemplary method of detecting an incoming signal transmitted by a phone line. At block 401, an incoming signal may be detected at a detection system. For example, an inductive coil may detect a signal transmitted by a phone line. Other detection devices may be implemented. At block 402, the incoming signal may be processed. For example, signal may be filtered, amplified, modulated, etc. Other processing steps may be applied.

For example, the signal may be filtered by passing a predetermined band of frequency spectrum centered on the data frequency spectrum of the detected signal. Also, the noise frequency spectrum of the detected signal may be attenuated or rejected. The filtering process may be repeated multiple times until the detected signal may be achieve a predetermined clarity. Also, the signal may be amplified by an amplifier and/or other amplifying components. Various method of amplification of the filtered signal may be implemented. The amplifying process may include multiple amplifying stages until the filtered signal may achieve a predetermined strength.

In addition the signal may be modulated, filtered, amplified, mixed, tuned and/or other various types of signal processing to achieve a predetermined signal characteristics. Furthermore, the signal may be transmitted to a modulator/demodulator. The signal may be amplitude modulated, frequency modulated and/or other methods of modulation. The signal may be modulated by an intermediate carrier wave to obtain an intermediate modulated signal. The intermediate modulated signal may be amplified to achieve predetermined signal strength. Also, the intermediate modulated signal may be filtered to remove any noise that may be incurred during signal processing to achieve a predetermined clarity.

The intermediate modulated signal may be processed to a radio frequency signal to be transmitted. In an exemplary embodiment, an oscillator may generate a signal associated with the intermediate modulated signal and/or radio frequency signal. The frequency of the signal generated by the oscillator may be determined based on the transmission radio frequency and/or the intermediate modulated frequency. The transmission radio frequency may be determined by an output signal of a mixer. The signal generated by the oscillator may be transmitted to the mixer along with the intermediate modulated signal and the mixer may output a signal having transmission radio frequency. The transmission radio frequency signal generated by the mixer may be calculated by the sum or the difference of the frequency of the signal generated by the oscillator and the frequency of the intermediate modulated signal by trigonometric angle sum and/or difference identities. For example, when the transmission radio frequency may be predetermined to be 802.11 MHz and the predetermined intermediate modulated frequency may be 890 kHz, therefore, the signal generated by the oscillator may have a frequency of 801.22 MHz or 803 MHz. Therefore the intermediate modulated signal at 890 kHz may be easier to transmit at a frequency of 802.11 MHz in order to prevent interference with other electromagnetic wave.

The radio frequency modulated signal may be further amplified to achieve the predetermined transmission range. The amplification process of the radio frequency modulated signal may be similar to the amplifying process described above.

At block 403, the processed signal sent may be transmitted to a remote system via a wired and/or wireless network. For example, the processed signal may be transmitted via an antenna over a wireless network to the remote system. At block 404, the processed signal may be filtered to reject the incoming signal in order to prevent a telephone system from ringing. A rejecting band of frequency may be associated with the incoming signal. At block 405, the telephone system may suppress an associated ring tone or other notification signal.

Figure 5:
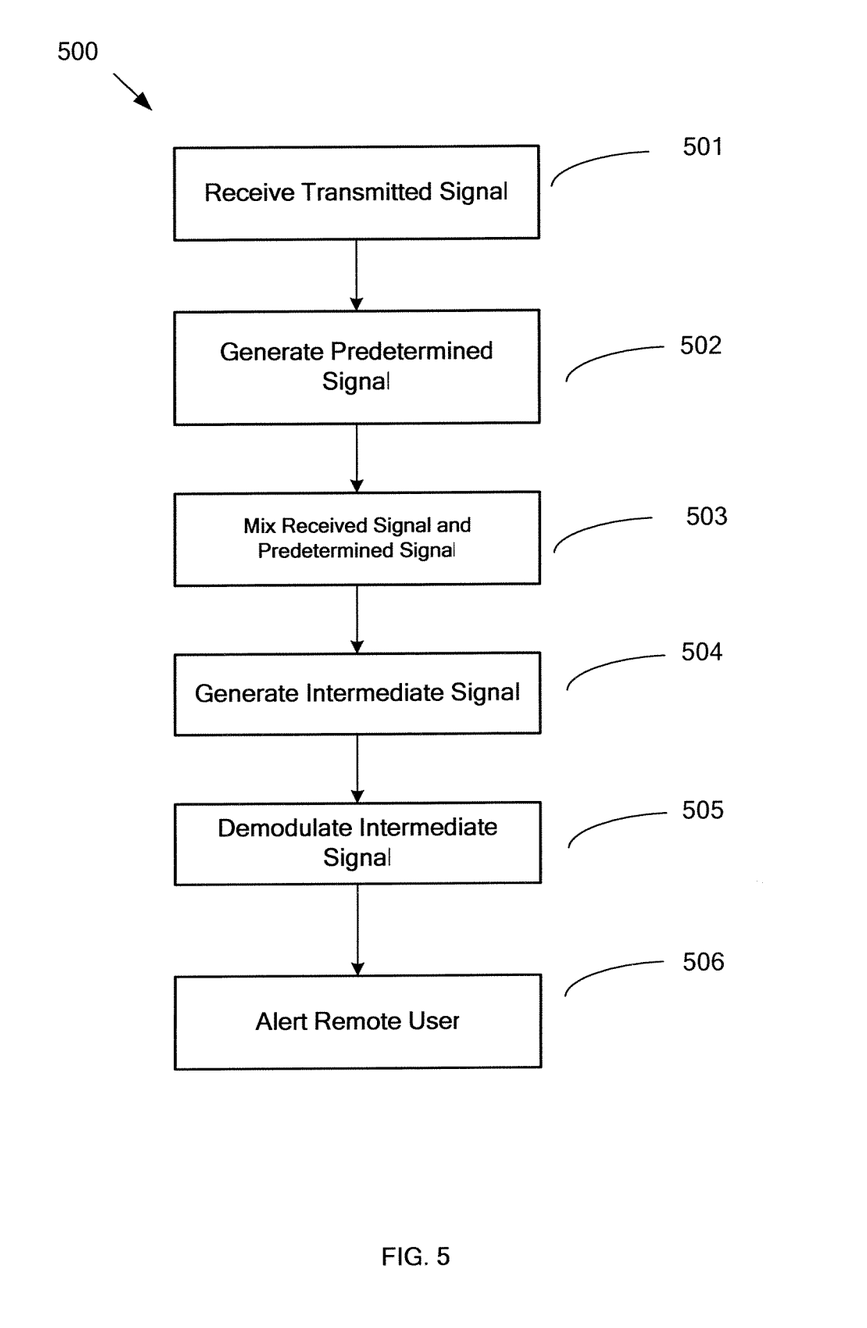
FIG. 5 is an exemplary flowchart illustrating a process of alerting a remote user of an incoming telephone call, according to an exemplary embodiment.

FIG. 5, depicts an exemplary flowchart illustrating a method for alerting a remote user of an incoming telephone call 500, according to an exemplary embodiment. At block 501, a modulated signal sent by a detection system may be received by an antenna.

At block 502 a predetermined signal may be generated. In addition, if the signal received by the antenna is weak, an amplification process may be implemented. The signal may be fed through a single stage amplifier or a multi-stage amplifier to achieve the predetermined strength for the modulated signal. In each amplifier stage, a modulated signal may be amplified by taking a power from a power supply and controlling the output of the amplifier stage which may be associated with the modulated signal. Other amplifying methods may be implemented.

Moreover, at block 502, an oscillator may generate a signal associated with the received modulated signal. The frequency of the signal generated by the oscillator may be determined based on the radio frequency of the received modulated signal and/or a predetermined intermediate modulated signal frequency.

At block 503, the signal associated with the received modulated signal may be transmitted to a mixer along with the received modulated signal to produce an intermediate modulated signal. For example, the intermediate modulated signal may be calculated by the sum or the difference of the signal associated with the received modulated signal generated by the oscillator and the received modulated signal by trigonometric angle sum and/or difference identities.

At block 504, an intermediate modulated signal may be generated by processing the received modulated signal in order to enhance the processing of the signal.

In addition, the intermediate modulated signal may be filtered and/or amplified. For example, intermediate modulated signal may be filtered by a single stage of filter or multiple-stages of filter. Each filtering stage may include a band of passing frequency centered in association with intermediate modulated signal while rejecting undesired frequency associated with the intermediate modulated signal. Therefore, a predetermined band of frequency spectrum centered on the data frequency spectrum of the intermediate modulated signal may be filtered through while the noise frequency spectrum of the intermediate modulated signal may be attenuated and/or rejected.

Also, the intermediate modulated signal may be amplified by a single stage amplifier or a multi-stage amplifier to achieve the predetermined signal strength for the intermediate modulated signal. Each amplifier stage may include a single amplifier or a combination of various types of amplifiers.

At block 505, the intermediate modulated signal may be demodulated to recover the incoming signal. The demodulation process may reproduce the incoming signal from the intermediate modulated signal.

At block 506, the recovered incoming signal may be transmitted to a speaker to alert a remote user of an incoming telephone call and/or any information transmitted to the remote user.

Figure 6:
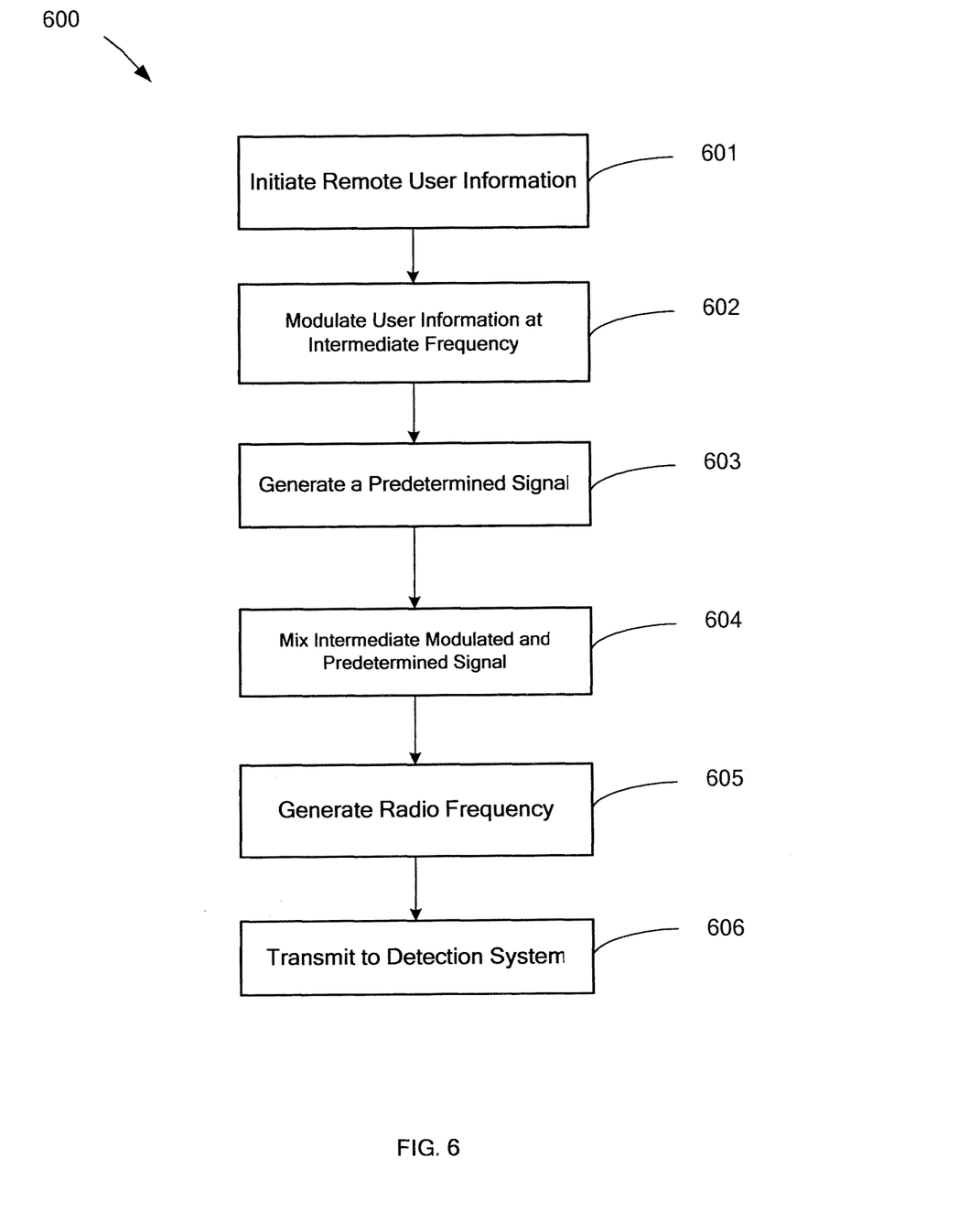
FIG. 6 is an exemplary flow chart illustrating a process of transmitting user information from a remote system, according to an exemplary embodiment.

FIG. 6, depicts an exemplary flowchart illustrating a method for transmission from a remote user 600, according to an exemplary embodiment. At block 601, a remote user may transmit information associated with the remote user back to the detection system. Information associated with a remote user (e.g., voice data, acoustic data or any similar form of data) may be captured by a microphone or other device. The microphone may convert information associated with the remote user from a voice data to an electrical signal.

At block 602, the electrical signal transmitted by the microphone may be modulated by a modulator/demodulator. The electrical signal may be modulated by an intermediate carrier signal which may have a frequency lower than the transmission radio frequency. The electrical signal transmitted by the microphone may be modulated by various modulation methods.

In addition, the intermediate modulates signal may be amplified and/or filtered. For example, the intermediate modulated signal may be amplified by a single stage amplifier or a multi-stage amplifier to achieve the predetermined signal strength for the intermediate modulated signal. Each amplifier stage may include a single amplifier or a combination of various types of amplifiers.

Also, intermediate modulated signal may be filtered by a single stage of filter or multiple-stages of filter. Each filtering stage may include a band of passing frequency centered in association with intermediate modulated signal while rejecting undesired frequency associated with the intermediate modulated signal. Therefore, a predetermined band of frequency spectrum centered on the data frequency spectrum of the intermediate modulated signal may be filtered through while the noise frequency spectrum of the intermediate modulated signal may be attenuated and/or rejected.

At block 603, a signal associated with the transmission of the intermediate modulated signal may be generated. A signal generated by the oscillator may be determined based on the transmission radio frequency signal and/or the frequency of the intermediate modulated electrical signal.

At block 604, the signal associated with the transmission of the intermediate modulated signal may be transmitted to a mixer along with the intermediate modulated signal to produce the transmission radio frequency signal. For example, the mixer may generate the transmission radio frequency signal generated by calculating the sum or the difference of a signal associated with the transmission of the intermediate modulated signal generated by the oscillator and the intermediate modulated electrical signal by trigonometric angle sum and/or difference identities.

At block 605, the mixer may generate the transmission radio frequency signal for enabling an extended transmission range to the detection system. In addition, the transmission radio frequency signal may be further amplified to achieve predetermined signal strength before transmission. The transmission radio frequency signal may be fed through a single stage amplifier or a multi-stage amplifier to achieve the predetermined signal strength.

At block 606, the transmission radio frequency signal may be transmitted via an antenna at a predetermined frequency to the detection system to enable communication between the remote user and the detection system.

Figure 7:
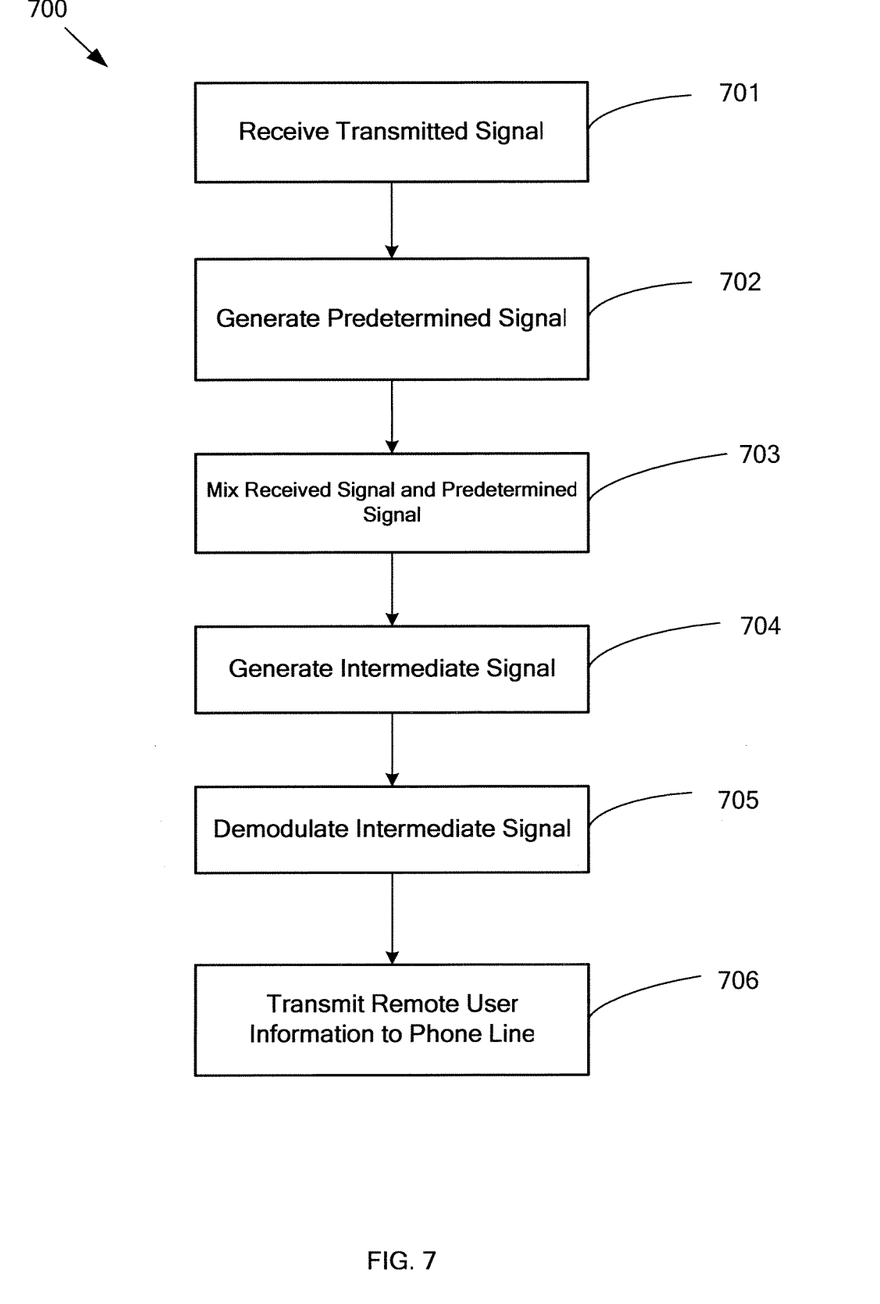
FIG. 7 is an exemplary flow chart illustrating a process of transmitting user information from a detection system, according to an exemplary embodiment.

FIG. 7, depicts an exemplary flowchart illustrating a method for a detecting and transmitting signal associated with a remote user to a phone line 700, according to an exemplary embodiment. At block 701, a modulated signal may be sent by a remote system may be received by an antenna.

The modulated signal received by the antenna may be weak and thus an amplification process may be implemented. The modulated signal may be fed through a single stage amplifier or a multi-stage amplifier to achieve the predetermined strength for the modulated signal. In each amplifier stage, a modulated signal may be amplified by taking a power from a power supply and controlling the output of the amplifier stage which may be associated with the modulated signal. Other amplifying methods may be implemented At block 702, an oscillator may generate a signal associated with the received modulated signal. The frequency of the signal generated by the oscillator may be determined based on the radio frequency of the received modulated signal and/ or a predetermined intermediate modulated signal frequency.

In block 703, the signal associated with the received modulated signal may be transmitted to a mixer along with the received modulated signal to produce an intermediate modulated signal. For example, the intermediate modulated signal may be calculated by the sum or the difference of the signal associated with the received modulated signal generated by the oscillator and the received modulated signal by trigonometric angle sum and/or difference identities.

At block 704, an intermediate modulated signal may be generated by processing the received modulated signal in order to enhance the processing of the signal. In addition, the intermediate modulated signal may be filtered and/or amplified. For example, intermediate modulated signal may be filtered by a single stage of filter or multiple-stages of filter. Each filtering stage may include a band of passing frequency centered in association with intermediate modulated signal while rejecting undesired frequency associated with the intermediate modulated signal. Therefore, a predetermined band of frequency spectrum centered on the data frequency spectrum of the intermediate modulated signal may be filtered through while the noise frequency spectrum of the intermediate modulated signal may be attenuated and/or rejected.

Also, the intermediate modulated signal may be amplified by a single stage amplifier or a multi-stage amplifier to achieve the predetermined signal strength for the intermediate modulated signal. Each amplifier stage may include a single amplifier or a combination of various types of amplifiers.

At block 705, the intermediate modulated signal may be demodulated to recover the incoming signal. The demodulation process may reproduce the incoming signal from the intermediate modulated signal.

The signal associated with a remote user may be amplified and/or filtered before transmitted to a phone line. The signal associated with a remote user may be amplified by an amplifier. Various methods of amplification of the filtered signal may be implemented in accordance to various types of amplifiers. The amplifying process may include multiple amplifying stages until the filtered signal may achieve a predetermined strength.

Also, the signal associated with a remote user may be filtered. The filter may pass a predetermined band of frequency spectrum centered on the data frequency spectrum of the signal associated with a remote user. Also, the filter may attenuate and/or reject the noise frequency spectrum of the signal associated with a remote user. The filtering process may be repeated multiple times until the detected signal may be achieve a predetermined clarity.

At block 706, the signal associated with a remote user may be transferred to an inductive coil or other receiving devices. For example, an inductive coil may be used to received an incoming signal transmitted by the phone line and induct the signal associated with a remote user onto the phone line. Also, one or more inductive coil may be implemented to receive an incoming signal transmitted by the phone line and additional one or more inductive coil may be implemented to transmit a signal associated with a remote user to the phone line. Thus, the signal associated with a remote user may be transmitted to the phone line.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A device, comprising:
   a detector for inductively detecting an incoming signal transmitted on a telephone line of a telephone system, and for inducting a user information signal received from a remote receiver associated with a remote user onto the telephone line, wherein the detector enables audio communication between a user of a device that initiates the incoming signal and a user of the remote receiver;

a first filter for processing the incoming signal by attenuating any noise associated with the incoming signal;

a transmitter for transmitting the processed signal to the remote receiver associated with a remote user and transmitting the processed signal to a second filter at the device; and the second filter for attenuating the incoming signal and suppressing a notification associated with the incoming signal at the telephone system for a first time period while permitting the telephone system to answer a call associated with the incoming signal;

wherein the remote receiver alerts the remote user of the processed signal for a second time period, and thereafter the remote receiver transmits the user information signal for induction onto the telephone line, wherein first time period overlaps with the second time period, wherein the alert comprises one or more of a ring, a tone, music, a previously-recorded voice signal, and a vibration notification signal.

2. The device of claim 1, wherein the detector for detecting an incoming signal is one or more inductive coils.

3. The device of claim 1, wherein the device is integrated with a telephone system.

4. The device of claim 1, wherein the device is connected to a computing device.

5. The device of claim 4, wherein the device is connected to the computing device via an interface port.

6. A device, comprising:
a receiver for receiving an incoming signal from a communication device attached to a telephone system, wherein the incoming signal is generated by a detector based at least in part on an inductively detected signal transmitted on a telephone line of the telephone system;

a processing unit for identifying information associated with the incoming signal;

an alerting unit for transmitting an alerting signal to a user for a first time period based at least in a part on the information associated with the incoming signal, wherein the alerting signal comprises one or more of a ring, a tone, music, a previously-recorded voice signal, and a vibration notification signal; and a transmitter for transmitting user information to the communication device, wherein the user information is inducted by the detector as a signal onto the telephone line of the telephone system, wherein the detector enables audio communication between a user of the communication device and a user of the device, wherein the detector is associated with at least one filter for suppressing the incoming signal at the telephone system for a second time period, wherein the first time period overlaps with the second time period, wherein suppressing the incoming signal comprises suppressing a notification associated with the incoming signal at the telephone system for the second time period while permitting the telephone system to answer a call associated with the incoming signal.

7. The device of claim 6, wherein the device is connected to one of a half-duplex communication system or a full-duplex communication system.

8. The device of claim 6, wherein the alerting unit comprises one or more of an ear piece, a head phone, a canalphone, a circumaural phone and a supra-aural phone.

9. The device of claim 6, wherein the processing unit further generates an intermediate frequency signal associated with the incoming signal and a predetermined signal associated with the incoming signal.

10. The device of claim 6, wherein the communication device comprises one or more of a wired telephone system, a mobile phone system, a satellite phone system and an IP telephone system.

11. A method, comprising:
detecting an incoming signal, wherein detecting the incoming signal comprises inductively detecting the incoming signal transmitted on a telephone line of a telephone system, wherein the incoming signal is detected by a detector;

processing the incoming signal by attenuating any noise associated with the incoming signal;

transmitting the processed incoming signal to a remote receiver associated with a remote user and transmitting the processed signal to a filter associated with the detector, suppressing, via the filter associated with the detector, the incoming signal at the telephone system for a first time period, wherein suppressing the incoming signal comprises attenuating the incoming signal to suppress a notification associated with the incoming signal at the telephone system for the first time period while permitting the telephone system to answer a call associated with the incoming signal; and receiving user information from the remote receiver associated with the remote user, wherein the user information is inducted by the detector as a signal onto the telephone line of the telephone system, wherein the detector enables audio communication between a user of a device that initiates the incoming signal and the remote user, wherein the first time period overlaps with a second time period that corresponds to receiving user information from the remote receiver.

12. The method of claim 11, wherein processing the incoming signal further comprises one or more amplifying, filtering, and modulating the incoming signal.

13. A non-transitory computer readable media comprising code to perform the acts of the method of claim 11.

14. A method, comprising:
receiving an incoming signal from a communication device, wherein the incoming signal is generated based at least in part on an inductively detected signal transmitted on a telephone line of a telephone system, wherein the incoming signal is generated by a detector;

processing the incoming signal and identifying information associated with the incoming signal;

transmitting an alerting signal to a remote user for a first time period based at least in a part on the information associated with the incoming signal, wherein the alerting signal comprises one or more of a ring, a tone, music, a previously-recorded voice signal, and a vibration notification signal; and receiving user information from a remote receiver associated with the remote user, wherein the user information is inducted as a signal onto the telephone line of the telephone system, wherein the detector enables audio communication between a user of the communication device and the remote user, wherein the detector is associated with at least one filter for suppressing the incoming signal at the telephone system for a second time period, wherein the first time period overlaps with the second time period, wherein suppressing the incoming signal comprises suppressing a notification associated with the incoming signal at the telephone system for the second time period while permitting the telephone system to answer a call associated with the incoming signal.

15. The method of claim 14, wherein the processing the incoming signal comprises generating an intermediate frequency signal associated with the incoming signal and a predetermined signal associated with the incoming signal.

16. A non-transitory computer readable media comprising code to perform the acts of the method of claim 14.

* * * * *